US012650200B2

(12) United States Patent
Nguyen et al.

(10) Patent No.: US 12,650,200 B2
(45) Date of Patent: Jun. 9, 2026

(54) QUICK-RELEASE PUMP MOUNTING BRACKET

(71) Applicant: Blue-White Industries, Ltd., Huntington Beach, CA (US)

(72) Inventors: John T. Nguyen, Fountain Valley, CA (US); Robert E. Gledhill, III, Huntington Beach, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 0 days.

(21) Appl. No.: 18/755,477

(22) Filed: Jun. 26, 2024

(65) Prior Publication Data

US 2025/0172236 A1      May 29, 2025

Related U.S. Application Data

(63) Continuation of application No. 18/465,556, filed on Sep. 12, 2023, now Pat. No. 12,044,354, which is a continuation of application No. 16/996,667, filed on Aug. 18, 2020, now Pat. No. 11,781,709.

(60) Provisional application No. 62/888,710, filed on Aug. 19, 2019.

(51) Int. Cl.
F16M 11/00      (2006.01)
F04B 53/22      (2006.01)
F16M 13/02      (2006.01)

(52) U.S. Cl.
CPC ............. F16M 13/02 (2013.01); F04B 53/22 (2013.01)

(58) Field of Classification Search
CPC ....... F16M 13/02; F16M 11/041; F04B 53/22; F04B 53/16; F04B 39/121; F04D 29/60
See application file for complete search history.

(56) References Cited

U.S. PATENT DOCUMENTS

| | | | |
|---|---|---|---|
| 3,388,885 A | 6/1968 | Holmes | |
| 4,444,358 A | 4/1984 | Spohn et al. | |
| 5,356,105 A | 10/1994 | Andrews | |
| 5,494,250 A | 2/1996 | Chen | |
| 5,664,292 A | 9/1997 | Chen | |
| 6,644,606 B1 | 11/2003 | Seidel | |
| 7,001,153 B2 | 2/2006 | McDowell et al. | |
| 7,284,964 B2 | 10/2007 | McDowell et al. | |
| D555,459 S | 11/2007 | Goodwin, III et al. | |
| D631,735 S | 2/2011 | Johnson | |
| D635,013 S | 3/2011 | Larsen | |
| 8,079,559 B1 * | 12/2011 | Say ........................ | A47L 9/0009 248/222.12 |
| 8,172,190 B2 | 5/2012 | Dang | |

(Continued)

FOREIGN PATENT DOCUMENTS

CN            201027711 Y      2/2008

*Primary Examiner* — Amy J. Sterling
(74) *Attorney, Agent, or Firm* — Knobbe, Martens, Olson & Bear, LLP

(57)            ABSTRACT

A quick mounting bracket for a pump is provided. The bracket includes a flexible handle that moves relative to stabilizer tabs. The bracket has ramped surfaces that guide a portion of the pump housing into a receiving slot of the bracket. A hinge of the handle biases the handle away from the pump such that the handle is driven to overlap the portion of the pump housing that seats into the receiving slot, thereby locking the pump onto the bracket until the handle is move to clear receiving slot and allow the pump to be removed from the bracket.

19 Claims, 11 Drawing Sheets

(56) References Cited

U.S. PATENT DOCUMENTS

| | | | |
|---|---|---|---|
| 8,215,931 | B2 | 7/2012 | McDowell et al. |
| 8,418,364 | B2 | 4/2013 | McDowell et al. |
| 8,639,363 | B2 | 1/2014 | Gledhill, III et al. |
| 9,374,024 | B2 | 6/2016 | Nguyen et al. |
| 9,389,109 | B2 | 7/2016 | Gledhill, III et al. |
| D766,601 | S | 9/2016 | Barre et al. |
| 9,523,374 | B2 | 12/2016 | Yazykov |
| 9,777,720 | B2 | 10/2017 | Gledhill, III et al. |
| 9,828,984 | B2 | 11/2017 | Gledhill, III et al. |
| 9,909,579 | B2 | 3/2018 | Gledhill, III et al. |
| 9,996,089 | B2 | 6/2018 | Gledhill, III et al. |
| D821,850 | S | 7/2018 | Tyrer |
| 10,281,083 | B2 | 5/2019 | Bacallao et al. |
| 10,330,094 | B2 | 6/2019 | Gledhill, III et al. |
| D853,224 | S | 7/2019 | Bacallao |
| 10,385,859 | B2 | 8/2019 | Roussel et al. |
| D878,096 | S | 3/2020 | Tortorella, Jr. |
| 10,823,167 | B2 | 11/2020 | Dietzsch et al. |
| 10,948,320 | B2 | 3/2021 | Gledhill, III et al. |
| D929,838 | S | 9/2021 | Tschan |
| 11,131,300 | B2 | 9/2021 | Gledhill, III et al. |
| D932,289 | S | 10/2021 | Tortorella, Jr. |
| 11,150,118 | B2 | 10/2021 | Gledhill, III et al. |
| 11,221,004 | B2 | 1/2022 | Gledhill, III et al. |
| D945,870 | S | 3/2022 | Vandenberg |
| 11,261,857 | B2 | 3/2022 | Gledhill, III et al. |
| D959,238 | S | 8/2022 | Nguyen et al. |
| 11,402,248 | B2 | 8/2022 | Gledhill, III et al. |
| 11,485,653 | B2 | 11/2022 | Gledhill, III et al. |
| 11,578,716 | B2 | 2/2023 | Gledhill, III et al. |
| 11,639,863 | B2 | 5/2023 | Nguyen et al. |
| 11,703,362 | B2 | 7/2023 | Nguyen et al. |
| D997,075 | S | 8/2023 | Donelson |
| D999,123 | S | 9/2023 | Smith |
| 11,754,065 | B2 | 9/2023 | Nguyen et al. |
| 11,768,092 | B2 | 9/2023 | Gledhill, III et al. |
| 11,768,929 | B2 | 9/2023 | Gledhill, III et al. |
| D1,000,254 | S | 10/2023 | Nonah |
| 11,781,709 | B2 | 10/2023 | Nguyen et al. |
| 11,891,989 | B2 | 2/2024 | Gledhill, III et al. |
| 11,898,546 | B2 | 2/2024 | Gledhill, III et al. |
| 11,939,972 | B2 | 3/2024 | Nguyen et al. |
| D1,030,452 | S | 6/2024 | Nguyen et al. |
| 12,044,354 | B2 | 7/2024 | Nguyen et al. |
| 12,049,887 | B2 | 7/2024 | Nguyen et al. |
| 12,135,023 | B2 | 11/2024 | Murphy et al. |
| 12,264,663 | B2 | 4/2025 | Gledhill, III et al. |
| 12,281,922 | B2 | 4/2025 | Gledhill, III et al. |
| 12,298,161 | B2 | 5/2025 | Nguyen et al. |
| 12,339,145 | B2 | 6/2025 | Nguyen et al. |
| 12,353,539 | B2 | 7/2025 | Gledhill, III et al. |
| 12,486,841 | B2 | 12/2025 | Gledhill, III et al. |
| 2009/0078848 | A1 | 3/2009 | Caldwell et al. |
| 2010/0005655 | A1 | 1/2010 | Nguyen |
| 2011/0180172 | A1 | 7/2011 | Gledhill, III et al. |
| 2015/0211509 | A1 | 7/2015 | Gledhill, III et al. |
| 2018/0291886 | A1 | 10/2018 | Gledhill, III et al. |
| 2018/0298891 | A1 | 10/2018 | Gledhill, III et al. |
| 2022/0316463 | A1 | 10/2022 | Gledhill, III et al. |
| 2023/0341083 | A1* | 10/2023 | Sharpstone ............. F04B 53/22 |
| 2023/0355044 | A1 | 11/2023 | Bai |
| 2023/0417582 | A1 | 12/2023 | Nguyen et al. |
| 2024/0003724 | A1 | 1/2024 | Nguyen et al. |
| 2024/0011479 | A1 | 1/2024 | Gledhill, III et al. |
| 2024/0028694 | A1 | 1/2024 | Gledhill, III et al. |
| 2024/0110559 | A1 | 4/2024 | Nguyen et al. |
| 2024/0247959 | A1 | 7/2024 | Gledhill, III et al. |
| 2024/0254983 | A1 | 8/2024 | Nguyen et al. |
| 2024/0271612 | A1 | 8/2024 | Murphy et al. |
| 2024/0392770 | A1 | 11/2024 | Anderson et al. |
| 2024/0401581 | A1 | 12/2024 | Gledhill, III et al. |
| 2024/0401584 | A1 | 12/2024 | Gledhill, III et al. |
| 2025/0172135 | A1 | 5/2025 | Nguyen et al. |
| 2025/0237536 | A1 | 7/2025 | Gledhill, III et al. |
| 2025/0264098 | A1 | 8/2025 | Murphy et al. |

* cited by examiner

QUICK-RELEASE PUMP MOUNTING BRACKET

INCORPORATION BY REFERENCE TO ANY PRIORITY APPLICATIONS

This application is a continuation of U.S. patent application Ser. No. 18/465,556, filed Sep. 12, 2023, and entitled "QUICK-RELEASE PUMP MOUNTING BRACKET," which is a continuation of U.S. patent application Ser. No. 16/996,667, filed Aug. 18, 2020, and entitled "QUICK-RELEASE PUMP MOUNTING BRACKET," which claims priority to U.S. Provisional Application No. 62/888,710, filed Aug. 19, 2019, and entitled "QUICK-RELEASE PUMP MOUNTING BRACKET." The disclosure of each application cited in this paragraph is hereby incorporated by reference in its entirety.

BACKGROUND

Field

Certain embodiments discussed herein relate to methods, systems, and devices for mounting a pump or other piece of equipment to a wall or shelf.

DISCUSSION OF CERTAIN RELATED ART

Pumps and devices can be mounted onto a supporting structure to stabilize the pump or device during its operation. A stable connection between the device and the underlying structure may require more time or effort to assemble or disassemble. On the other hand, a quick and easy connection between the device and the supporting structure may be unstable or have reduced stability compared to a device-mounting system that takes longer or more effort to assemble. The present disclosure provides a connection system that addresses one or more of these problems with mounting a piece of equipment to a stabilizing structure.

SUMMARY

The systems, methods and devices described herein have innovative aspects, no single one of which is indispensable or solely responsible for their desirable attributes. Without limiting the scope of the present disclosure, some of the advantageous features will now be summarized.

Aspects of the present disclosure relate to apparatuses and methods for the safe, quick, and easy mounting of a device (e.g., pump) to an underlying support structure (e.g., wall or shelf). According to some variants, a pump assembly is provided herein. In some aspects, the pump assembly includes a base plate, a docking portion, a canted surface, a support shelf, a stop surface, and a pump housing. The docking portion can extend from the base plate to form a seating slot disposed between the docking portion and the base plate. The docking portion can include a handle disposed between a pair of stabilizer tabs. The handle can be connected to the base plate by a hinge such that the handle can move relative to the pair of stabilizer tabs. The canted surface can extend from the handle toward the base plate such that the canted surface overhangs at least a portion of the seating slot. The support shelf can extend from the base plate. The stop surface can extend from the support shelf and toward the docking portion.

In some aspects, a pump-mounting system is provided herein. The pump-mounting system includes a base plate, a stabilizer tab connected to the base plate, and a handle connected to the base plate by a hinge such that the handle can move relative to the stabilizer tab. The handle can include a canted surface that extends in a direction that is away from the stabilizer tab and toward the base plate.

In some aspects a pump assembly is provided herein. The pump assembly includes a pump, a base plate, a docking portion, a support shelf, and a footer. The pump defines a pump housing. The base plate defines a wall interface plane and at least partially defines an opening sized and shaped to receive at least one wall anchor seat. A docking portion extends from the base plate to form a seating slot disposed between the docking portion and the base plate. The pump housing, the base plate, and the docking portion are configured to enable at least a portion of the pump housing to be slidably received in the seating slot. A support shelf extends from the base plate. The support shelf defines a surface which engages the pump housing when at least a portion of the pump housing is slidably received in the seating slot. A footer extends from the base plate. The support shelf is disposed between the footer and the docking portion. The footer at least partially defines a first anchor seat for receiving a floor anchor.

Any of the features, components, or details of any of the arrangements or embodiments disclosed in this application, including without limitation any of the pump-mounting systems and any of the methods of mounting a device to the pump-mounting systems disclosed below, are interchangeably combinable with any other features, components, or details of any of the arrangements or embodiments disclosed herein to form new arrangements and embodiments.

BRIEF DESCRIPTION OF THE DRAWINGS

Throughout the drawings, reference numbers can be reused to indicate general correspondence between reference elements. The drawings are provided to illustrate example aspects described herein and are not intended to limit the scope of the disclosure.

DETAILED DESCRIPTION

While the present description sets forth specific details of various aspects of the present disclosure, it will be appreciated that the description is illustrative only and should not be construed in any way as limiting. Furthermore, various applications of such aspects and modifications thereto, which may occur to those who are skilled in the art, are also encompassed by the general concepts described herein.

Pumps and other pieces of equipment can be mounted on a shelf or on a wall to conserve space and maintain order in a multi-component system. For the sake of simplicity, the device-mounting systems of the present disclosure will be described in terms of mounting a pump onto a support structure. However, the mounting systems described herein can be used to mount a device other than a pump onto a support structure. It is desirable to have a pump-mounting system that can be used to mount the pump or device on a vertical surface (e.g., a wall) as well as on a horizontal surface (e.g., a shelf) to give a user more flexibility and options for the use of the pump-mounting system. It is also desirable to have a pump-mounting system that allows the pump to be connected and disconnected quickly and easily with the pump-mounting system. In some aspects, the device-mounting system of the present disclosure is a quick-release pump-mounting bracket that can be used to secure a pump to a wall or a shelf.

Figures 1A, 1B, 1C:
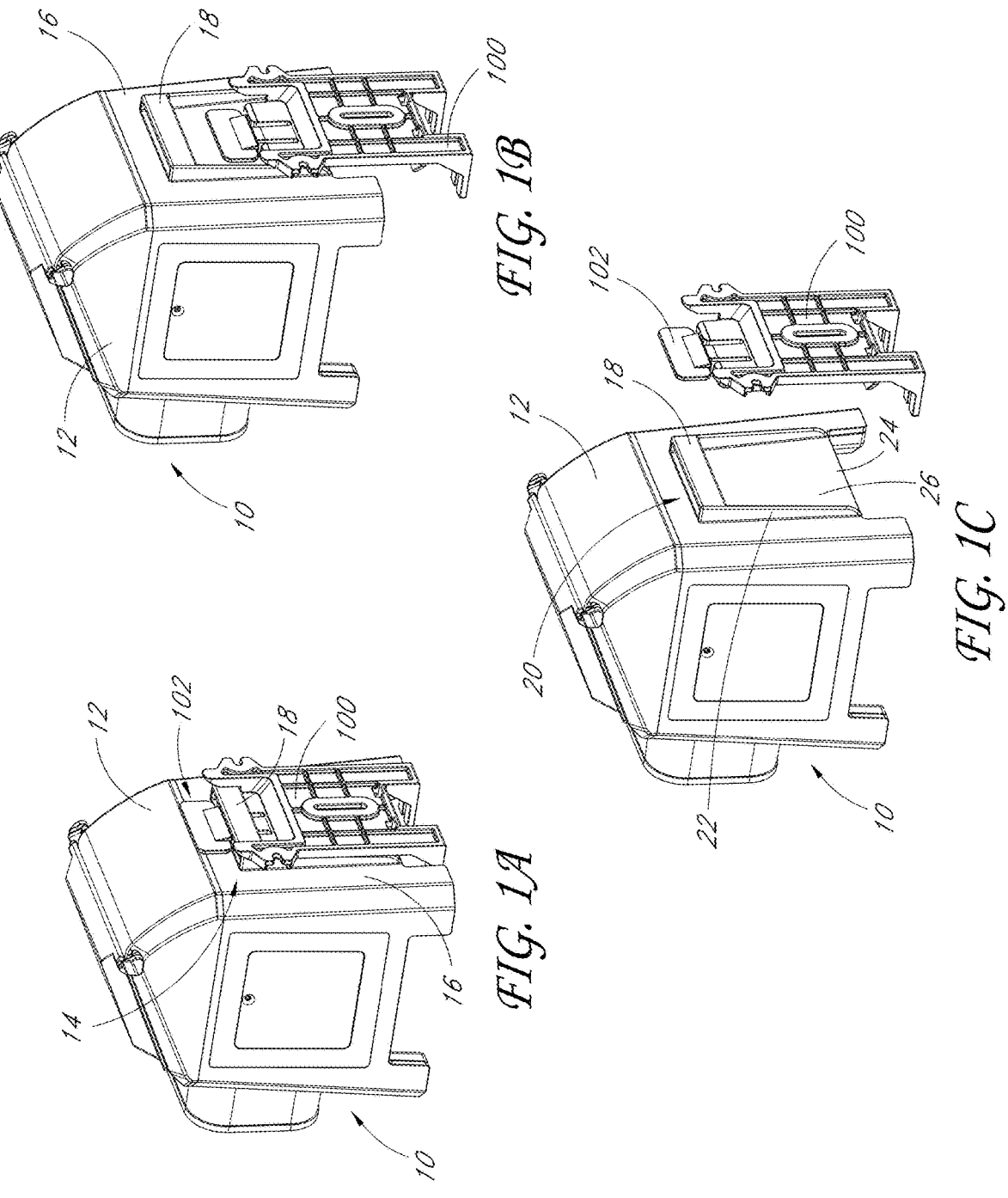
FIG. 1A is a perspective back view of a pump mounted onto an embodiment of a pump-mounting system according to some aspects of the present disclosure.
FIG. 1B shows the pump-mounting system of FIG. 1A in a partial state of connection with the pump.
FIG. 1C shows the pump-mounting system of FIG. 1A disconnected from the pump.

FIGS. 1A-1C depict an illustrative, non-limiting embodiment of a pump-mounting system 100 of the present disclosure. The pump-mounting system 100 is shown in different stages of connection with a pump 10. FIG. 1A shows the pump 10 fully secured to the pump-mounting system 100. FIG. 1B depicts the pump 10 in a partial state of connection with the pump-mounting system 100. FIG. 1C shows the pump 10 after the pump 10 has been removed or fully disconnected from the pump-mounting system 100.

As shown in FIGS. 1A-1C, the pump 10 can have an outer housing 12 that includes a receiving portion 14 on a back face 16 of the outer housing 12. The receiving portion 14 can be adapted to connect the pump 10 to the pump-mounting system 100. In the illustrated embodiment, the receiving portion 14 includes a band 18 that is spaced apart from a back face 16 of the outer housing 12 to form a passageway 20 (FIG. 1C) between the band 18 and the back face 16 of the outer housing 12. The pump-mounting system 100 can have a docking portion 102 that is configured to connect with the receiving portion 14 to secure the pump 10 to the pump-mounting system 100.

The receiving portion 14 can include a pair of side rails 22 (FIG. 1C) that extend from the band 18 to a bottom edge 24 of the back face 16 to form a corral 26 between the side rails 22. In some aspects, the height of the side rail 22 can increase as the side rail 22 extends from the bottom edge 24 to the band 18, as shown. In some variants, the height of the side rail 22 can remain approximately constant as the side rail extends from the bottom edge 24 to the band 18. In some aspects, the side rails 22 can be angled toward one another as the side rails 22 extend in the direction from the bottom edge 24 to the band 18 such that the width of the corral 26 is larger at the bottom edge 24 compared to the width of the corral 24 at the band 18. The side rails 22 and the corral 26 can help guide the docking portion 102 toward the receiving portion 14 during the mounting of the pump 10 onto the pump-mounting system 100. In some aspects, the receiving portion 14 and the docking portion 102 are arranged to allow the blind assembly of the docking portion 102 with the receiving portion 14. In other words, the pump-mounting system 100 can allow a user to secure the pump 10 onto the pump-mounting system 100 by feel and without requiring the user to view the receiving portion 14 or the docking portion 102 during the connection of the receiving portion 14 to the docking portion 102.

Figure 2B:
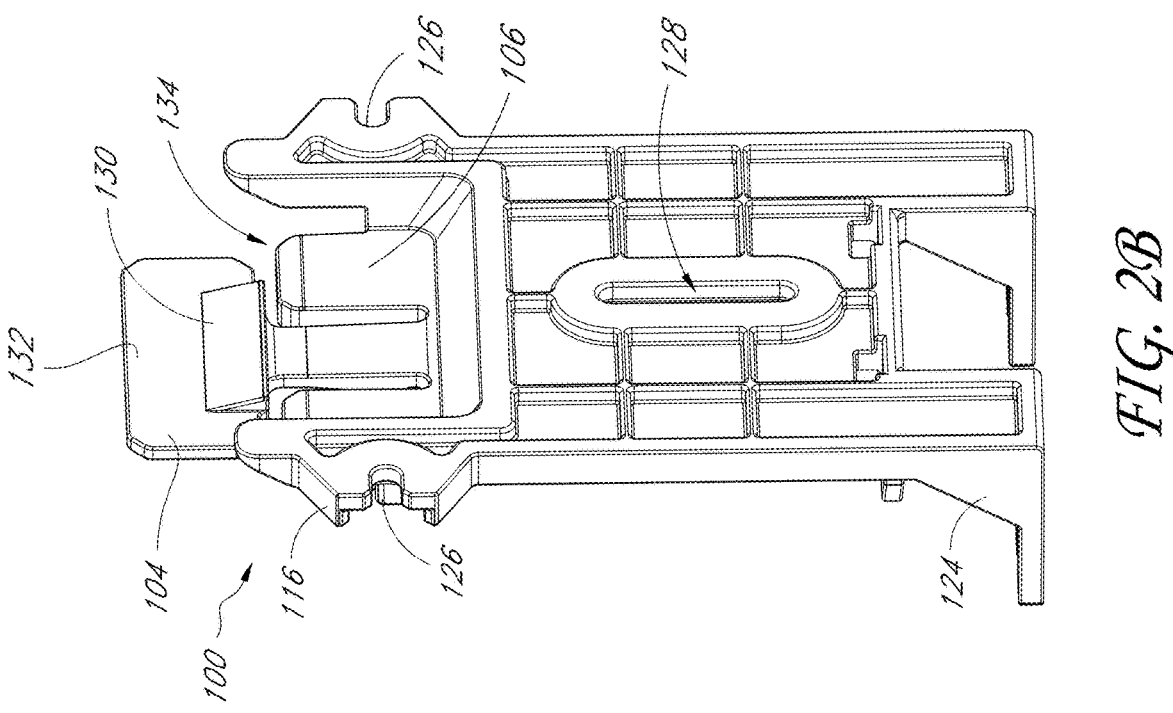
FIG. 2B shows a partial back perspective view of the pump-mounting system of FIG. 2A.
Figure 2A:
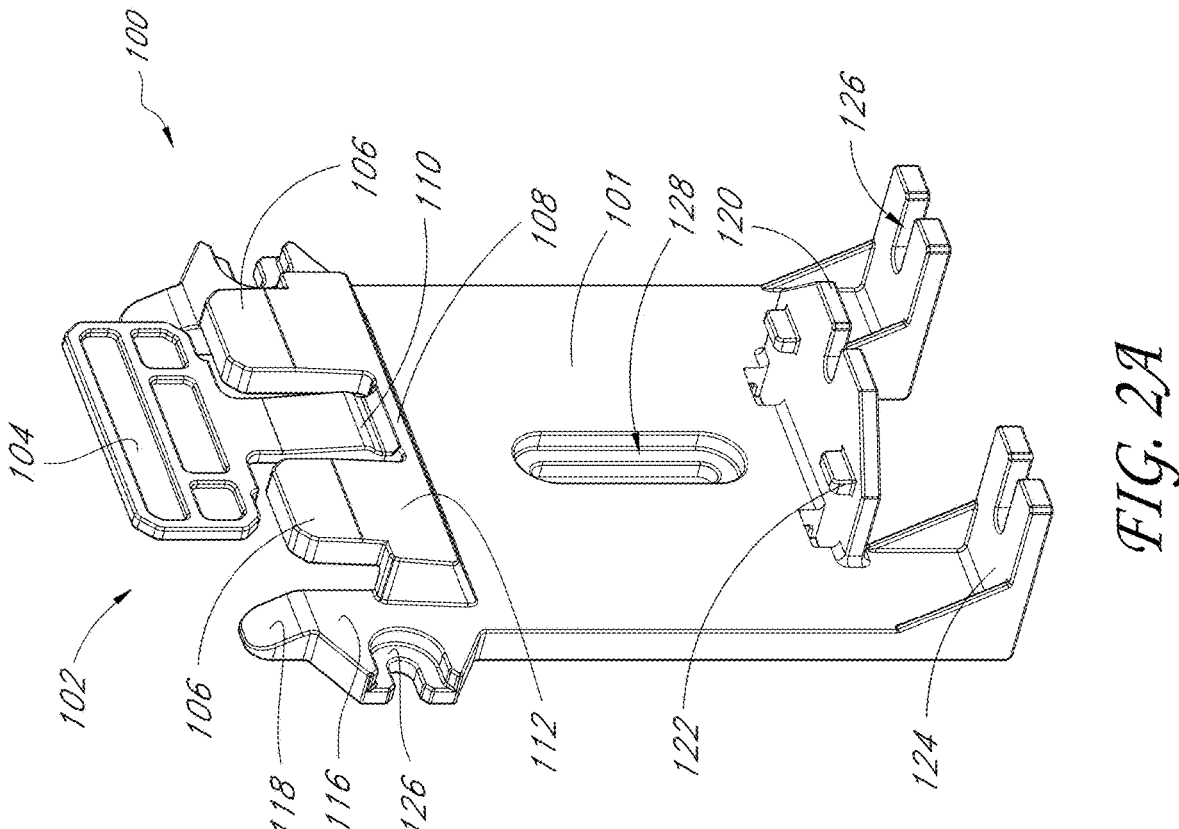
FIG. 2A shows a partial front perspective view of a pump-mounting system.

FIGS. 2A and 2B show a partial front view and a partial rear view, respectively, of an embodiment of the pump-mounting system 100. The pump-mounting system 100 can have a base plate 101 from which the docking portion 102 extends. The docking portion 102 can include a handle 104 that is disposed between a pair of stabilizer tabs 106, as shown. The docking portion 102 can include a crossbar 108 that joins the handle 104 and the pair of stabilizer tabs 106 to the base plate 101, as shown. The handle 104 can be joined to the crossbar 108 by a hinge 110. The hinge 110 can be configured to allow the handle 104 to flex toward or away from a front face 112 of the stabilizer tabs 106. The stabilizer tabs 106 can be configured to remain substantially fixed relative to the base plate 101.

The pump-mounting system 100 can include a pair of arms 116 that are disposed laterally of the stabilizer tabs 106 such that each of the stabilizer tabs 106 is positioned between the handle 104 and one of the arms 116. The arms 116 can include a ramped leading edge 118. The ramped leading edge 118 can facilitate seating the pump 10 onto the pump-mounting system 100, as described herein. The pump-mounting system 100 can include a support shelf 120 that extends away from the base plate 101. The support shelf 120 can include one or more stop surfaces 122. The stop surfaces 122 can prevent the pump 10 from being moved away from the base plate 101 after the pump 10 is secured to the pump-mounting system 100, as described herein. The pump-mounting system 100 can include one or more footers 124 that extend from the base plate 101 in the same direction that the support shelf 120 extends away from the base plate 101. The support shelf 120 can be disposed between the footers 124 and the docking portion 102. The footers 124 can be substantially co-planar with one another and can include anchor points 126 such that the footers 124 can be used to attach the pump-mounting system 100 to a horizontal or substantially horizontal support surface. The base plate 101 can define a wall interface plane and at least partially define an opening sized and shaped to receive at least one wall anchor seat. The base plate 101 can include a through hole 128 that allows the pump-mounting system 100 to be attached to a vertical or substantially vertical support surface. The arms 116 can also include anchor points 126 that allow the pump-mounting system 100 to be attached to a vertical or substantially vertical support surface.

The handle 104 can include a canted surface 130 (FIG. 2B) that extends from a rear face 132 of the handle 104. The docking portion 102 can extend from the base plate 101 to form a seating slot 134 disposed between the docking portion 102 and the base plate 101. The support shelf 120 can define a surface (e.g., stop surfaces 122) that engages the pump outer housing 12 when at least a portion of the pump outer housing 12 is slidably received in a seating slot 134. In some aspects, the seating slot 134 can be formed between the rear face of the stabilizing tabs 106 and the front face of the arms 116. The seating slot 134 can be sized to receive the band 18 of the outer housing 12 of the pump 10. The pump outer housing 12, the base plate 101, and the docking portion 102 can be configured to enable at least a portion of the pump outer housing 12 to be slidably received in the seating slot 134.

Figure 3:
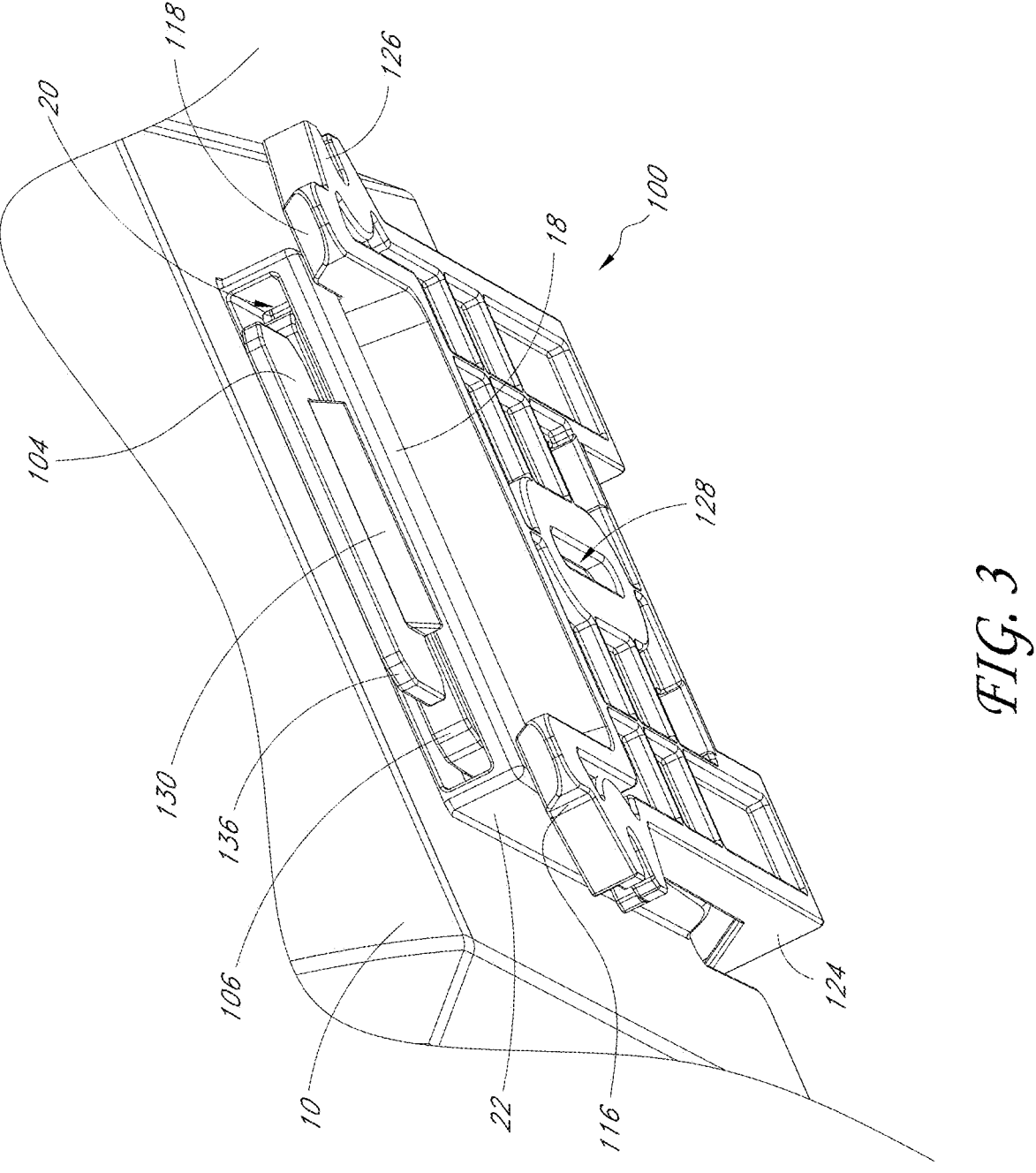
FIG. 3 is a closeup top view of a pump mounted onto a pump-mounting system.

FIG. 3 shows a top view of the pump-mounting system 100 connected with the pump 10. The handle 104 extends through the passageway 20 of the receiving portion 14. The canted surface 130 overhangs the band 18 of the receiving portion 14 such that the pump 10 cannot be moved away from the footer 124, thereby securing the pump 10 to the pump-mounting system 100. As can be appreciated from FIG. 3, the ramped leading edges 118 of the arms 116 and the canted surface 130 of the handle 104 can be adapted to help guide the band 18 into a receiving slot 134 (FIG. 2B). The handle 104 and the stabilizer tabs 106 can include chamfered corners 136. The chamfered corners 136 can help guide the pump-mounting system 100 into the corral 26 (FIG. 1C) of the receiving portion 14 when the pump 10 is mounted onto the pump-mounting system 100. The funnel-ing shape of the corral 26, the chamfered corners 136 of the handle 104 and the stabilizer tabs 106, the canted surface 130 and flexibility of the handle 104, and the ramped leading edges 118 of the arms 106 can each facilitate coupling the pump 10 to the pump-mounting system 100 by feel and without requiring a user to view the rear surface of the pump 10 to properly align the pump 10 with the pump-mounting system 100. The pump 10 can be quickly and easily removed from the pump-mounting system 100 by moving the handle 104 toward the pump 10 to clear the canted surface 130 from overlapping the band 18. With the canted surface 130 clear of the band 18, the pump 10 can be moved away from the footer 124 to disconnect the pump 10 from the pump-mounting system 100.

Figure 4:
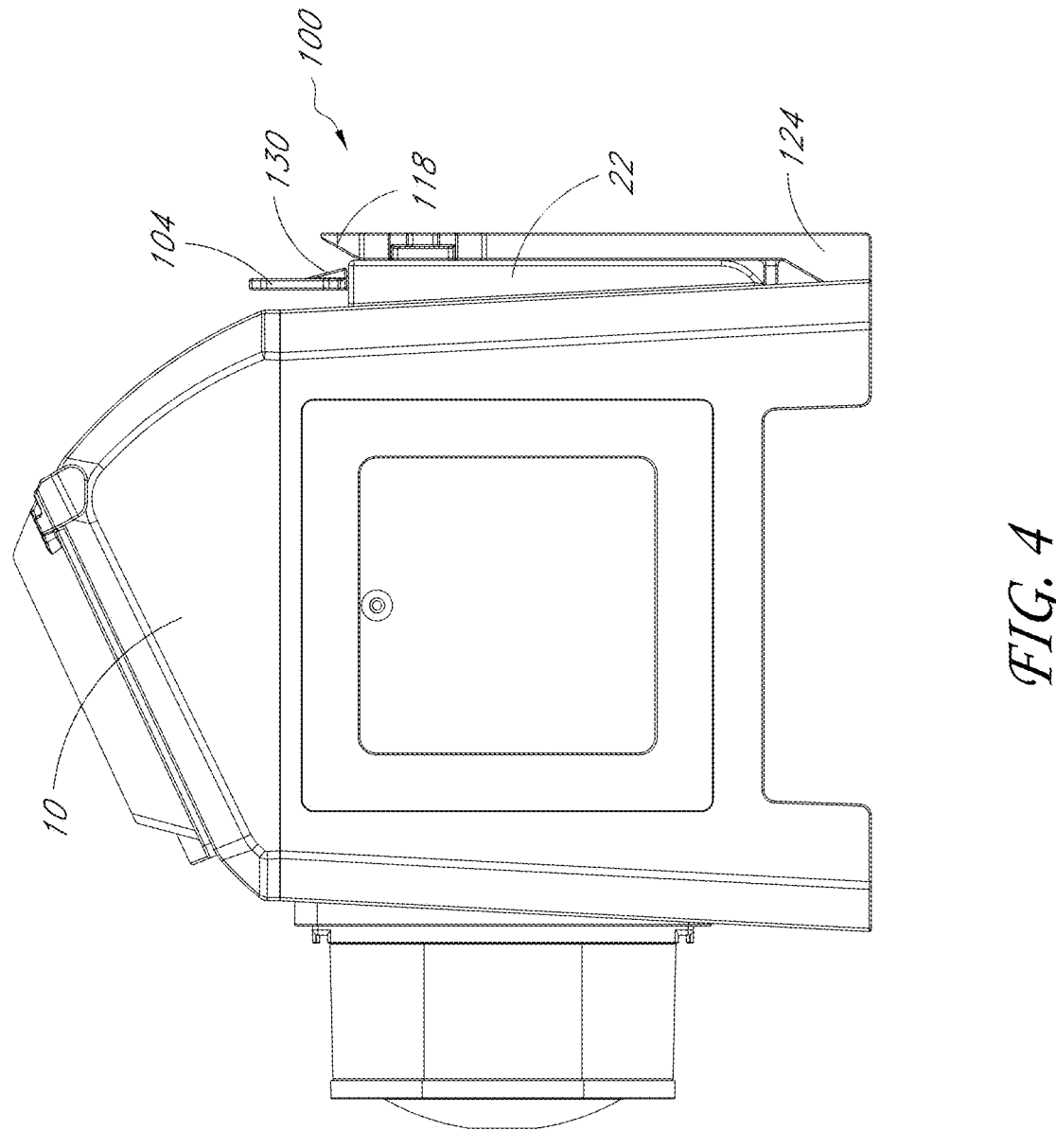
FIG. 4 is a side view of a pump mounted onto a pump-mounting system.

FIG. 4 shows a side view of the pump 10 connected with the pump-mounting system 100. As can be appreciated from FIG. 4, the canted surface 130 and the ramped leading edges 118 can guide the pump 10 onto the pump-mounting system 100 such that the user does not need to contact the handle 104 to mount the pump 10 onto the pump-mounting system 100. To connect the pump 10 with the pump-mounting system 100, the user can move the pump 10 relative to the pump-mounting system 100 to bring the handle 104 into the corral 26 (FIG. 1C), as discussed. With the handle 104 positioned in the corral 26, the pump 10 can be moved relative to the pump-mounting system 100 toward the footer 124. The canted surface 130 of the handle 104 can deflect the handle 104 to move the handle 104 toward the pump 10 as the band 18 (FIG. 1C) rides over the canted surface 130 toward the footer 124. Once the band 18 clears the canted surface 130 to bring the band 18 below the canted surface 130 and above the footer 124, the hinge 110 (FIG. 2A) can move the handle 104 away from the pump 10 such that the canted surface 130 overlaps the band 18. When the pump 10 is mounted onto the pump-mounting system 100, the band 18 can be secured between the stabilizer tabs 106 and the arms 116 such that the pump 10 is immobilized relative to the pump-mounting system 100. To disconnect the pump 10 from the pump-mounting system 100, a user can move the handle 104 toward the pump 10 while moving the pump 10 away from the footer 124 such that the handle 104 and the stabilizer tabs 106 can be removed from the passageway 20.

Figure 5:
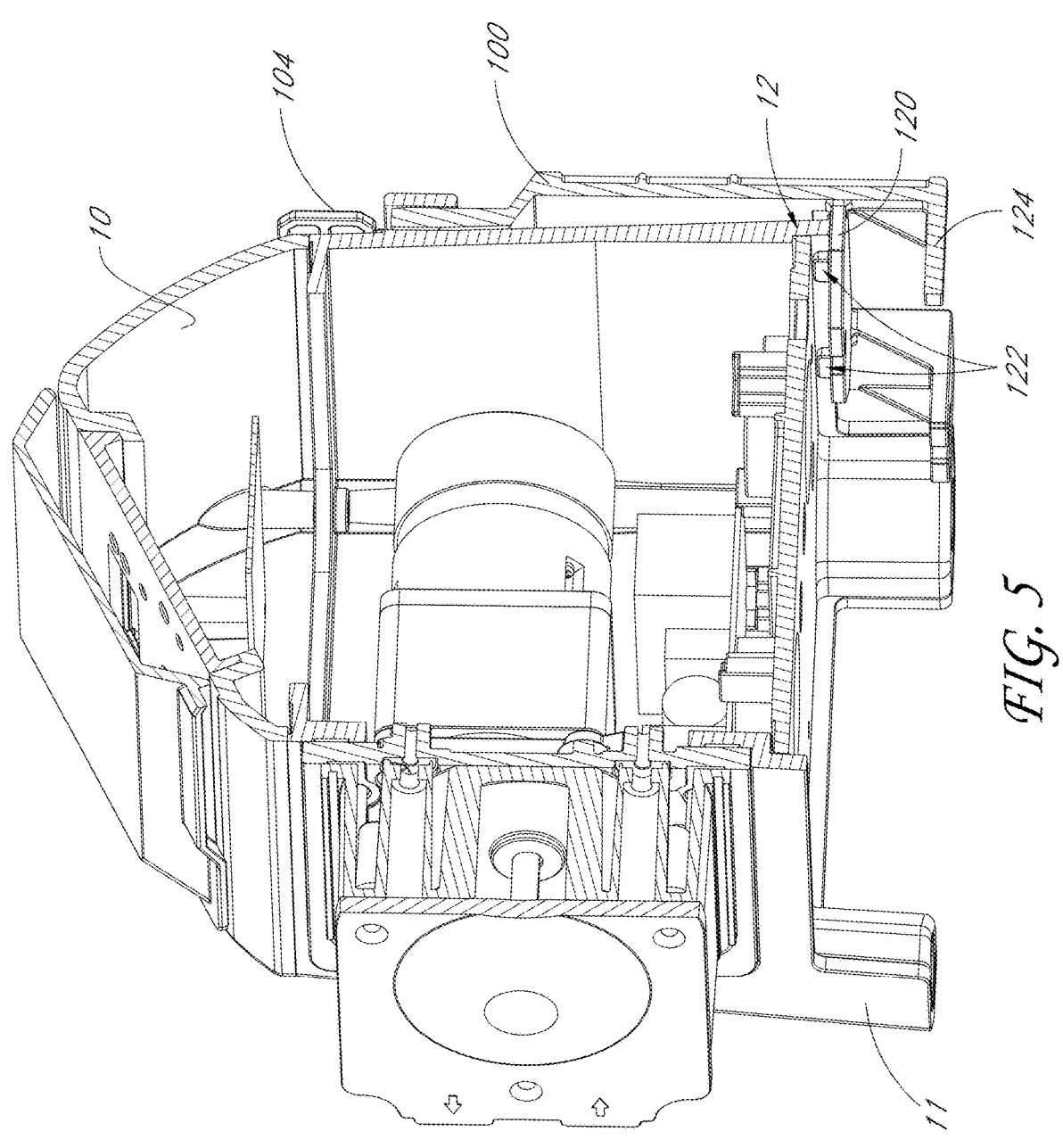
FIG. 5 is a partial cross-sectional side view of a pump mounted on a pump-mounting system.

FIG. 5 illustrates a cut away view of a pump 10 mounted onto a pump-mounting system 100. The support shelf 120 can be sized to support the pump 10. In some aspects, the pump-mounting system 100 can be mounted onto a vertical or substantially vertical surface such that the support shelf 120 holds the full weight of the pump 10 with the legs 11 of the pump 10 being spaced apart from a horizontal or substantially horizontal supporting surface. In some variants, the footers 124 can extend beyond the pump legs 11 such that the footer 124 can be mounted to a horizontal or substantially horizontal surface with the legs 11 spaced apart from the horizontal support surface, with the full weight of the pump 10 supported by the support shelf 120. In some variants, the pump-mounting system 100 can be sized such that the legs 11 and the footers 124 are each in contact with a horizontal or substantially horizontal support surface with the support shelf 120 supporting all, some, or none of the weight of the pump 10.

As can be appreciated from FIG. 5, the pump-mounting system 100 can be secured to a vertical support surface alone, to a horizontal support surface alone, or to both a vertical support surface and a horizontal support surface. The stop surfaces 122 can block a lip of the housing 12 from moving away from base plate 101. The stop surfaces 122 can prevent the pump 10 from moving forward if a person pulls on the pump 10 while the pump 10 is attached to the pump-mounting system 100. In some aspects, the pump-mounting system 100 can facilitate the mounting and unmounting of the pump 10 to an underlying support structure in a space-restricted environment. For example, with reference to FIG. 5, the pump 10 can be coupled or decoupled from the pump-mounting system 100 by moving the pump 10 in a vertical direction, allowing the pump 10 to be attached to a vertical or horizontal underlying support surface when horizontal access to the support surface is limited or blocked. With continued reference to FIG. 5, the pump-mounting system 100 facilitates mounting and unmounting of the pump 10 onto a horizontal or vertical underlying support surface in space-restricted environments where vertical or overhead clearance is limited. For example, the pump 10 need only be moved vertically with respect to the pump-mounting system 100 the amount nec-essary to clear the handle 104 from the band 18, at which point the pump 10 can be moved horizontally relative to the pump-mounting system 100.

Figure 6:
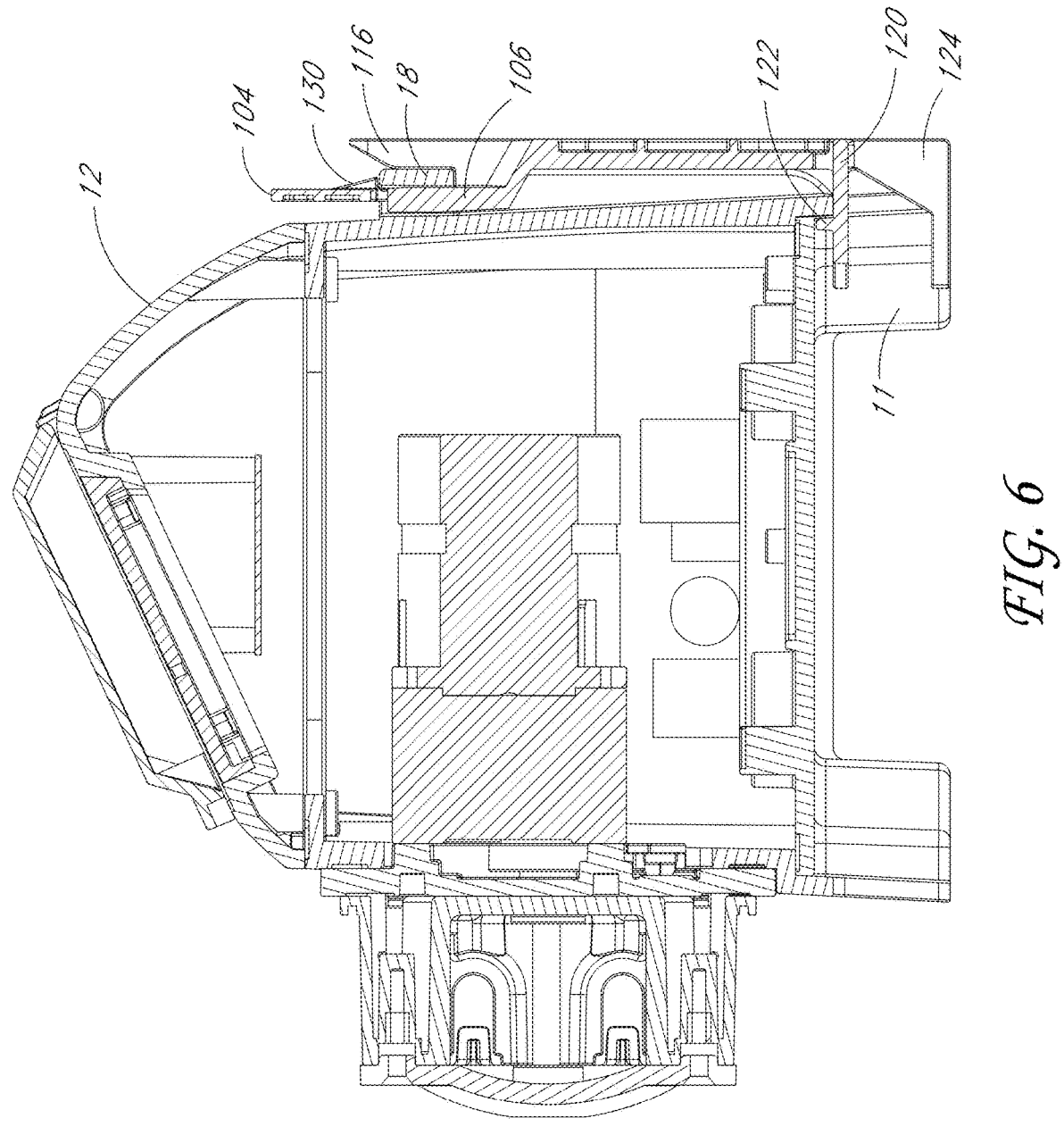
FIG. 6 is a side cross-sectional view of a pump mounted on a pump-mounting system.

FIG. 6 shows a side cross-sectional view of a pump 10 mounted on the pump-mounting system 100. The pump 10 is restrained from moving in the horizontal direction by the stabilizer tabs 106 that pass between the band 18 and the pump housing 12 and by the stop surfaces 122 of the support shelf 120. The pump 10 is restrained from moving in the vertical direction by the support shelf 120 and the canted surface 130 of the handle 104 that overhangs the band 18.

Figure 7:
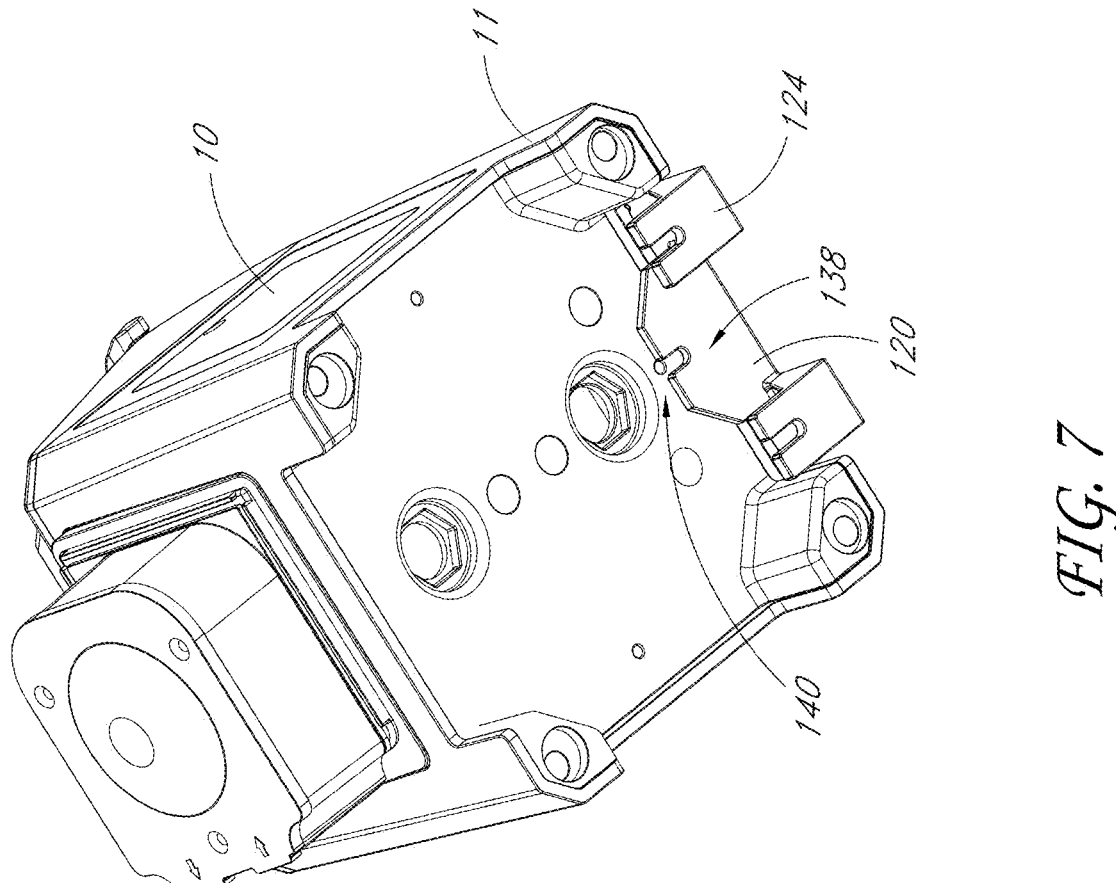
FIG. 7 is a partial bottom view of a pump mounted on a pump-mounting system.

FIG. 7 shows a bottom view of a pump 10 attached to the pump-mounting system 100. The support shelf 120 can include a through hole or slot 138 that aligns with a threaded hole 140 of the pump 10 when the pump 10 is attached to the pump-mounting system 100. The through hole or slot 138 can be sized such that a fastener 148 (FIG. 8B) can be passed through the through hole or slot 138 to secure the pump 10 to the pump-mounting system 100. In some aspects, the fastener 148 can be attached to the pump 10 without the use of a tool. For example, the fastener 148 can be a thumbscrew that is finger tightened into the threaded hole 140 of the pump 10. In some aspects, the fastener 148 can be config-ured to be attached to the threaded hole by feel and without requiring the user to see the threaded hole 140. In this way, a user can quickly attach or detach the pump 10 from the pump-mounting system 100 without requiring the use of a tool or visualization of the bottom of the pump 10.

Figure 8B:
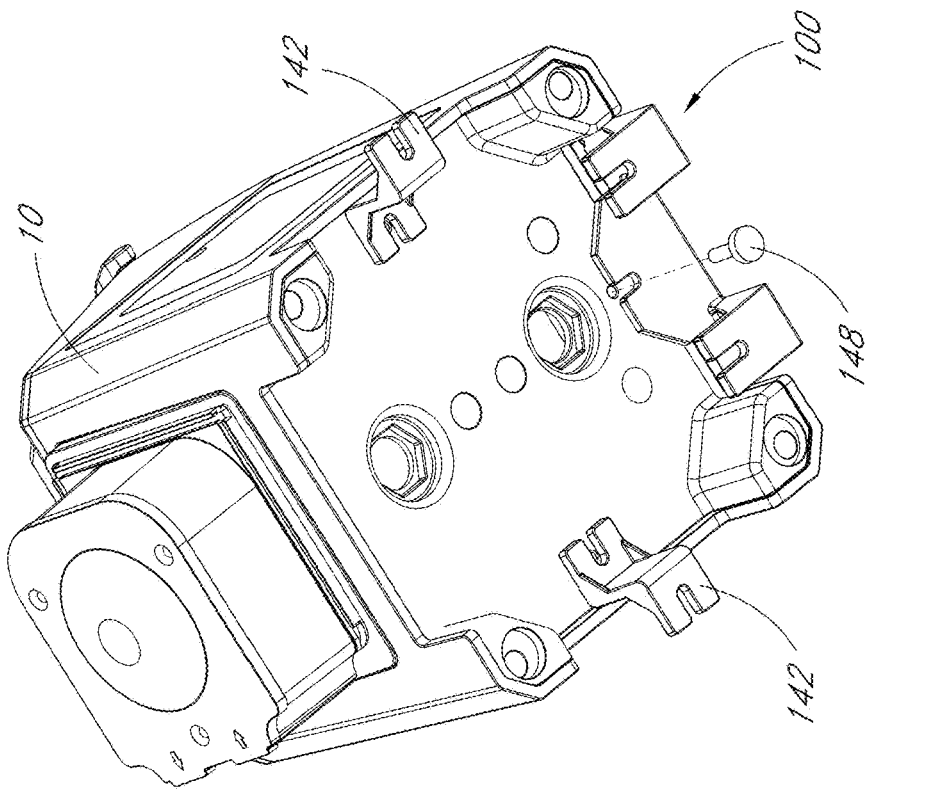
FIG. 8B is a partial bottom view of the pump and pump-mounting system of FIG. 8A.
Figure 8A:
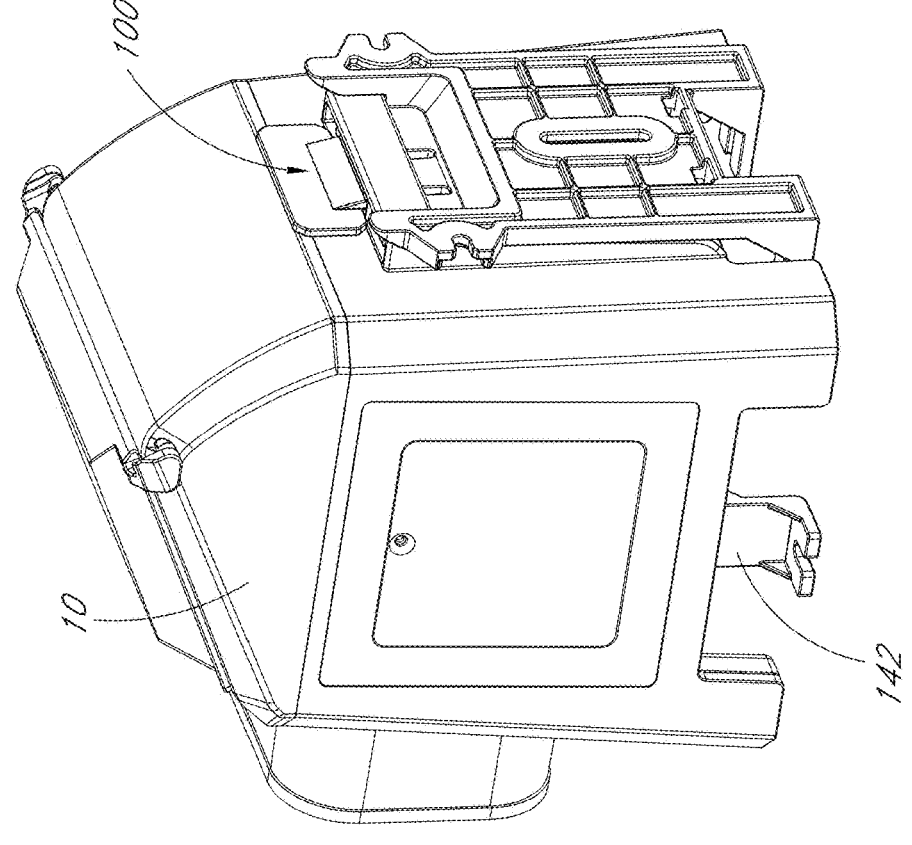
FIG. 8A is a partial back perspective view of a pump mounted on pump-mounting system according to some aspects of the present disclosure.

FIGS. 8A and 8B illustrate the pump-mounting system 100 can include additional support legs 142 that can be attached to the pump 10 to provide additional support and securement for the attachment of the pump 10 to a supporting surface. As shown, the additional support legs 142 can include a through hole or slot that aligns with a threaded hole of the pump 10 to allow the additional support legs 142 to be fastened to the pump 10, as described above with regard to the through hole or slot 138 of the support shelf 120.

Figure 9B:
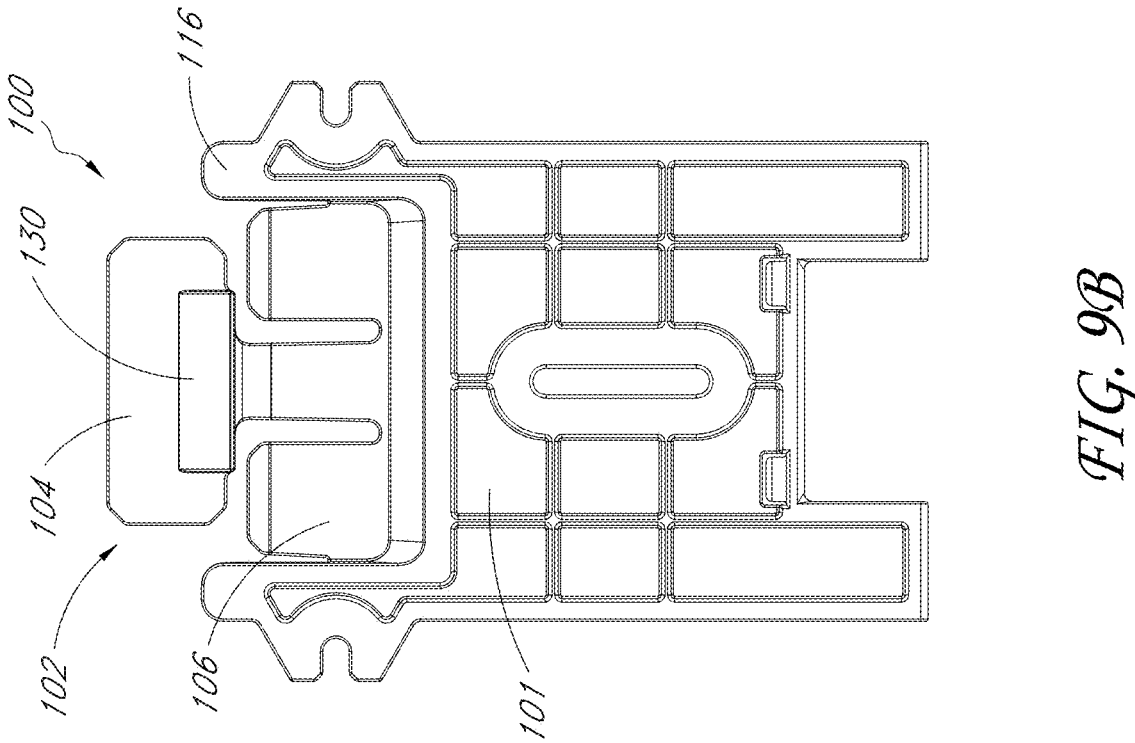
FIG. 9B is a rear view of the pump-mounting system of FIG. 9A.
Figure 9A:
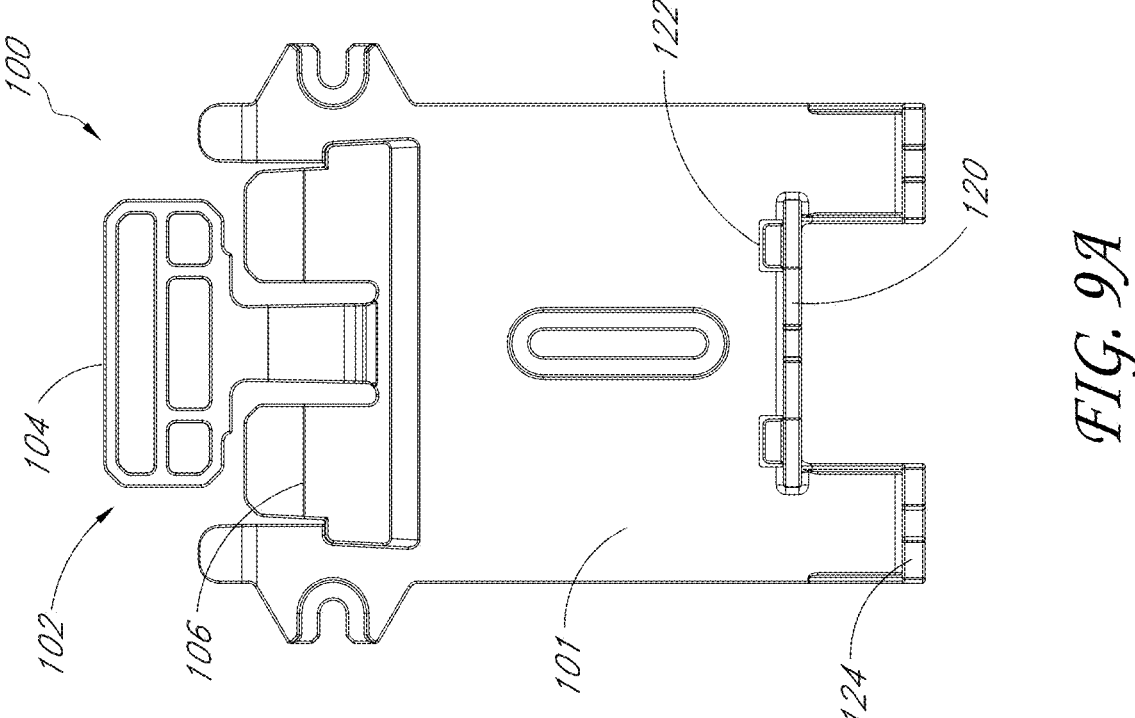
FIG. 9A is a front view of a pump-mounting system of the present disclosure.
Figure 9D:
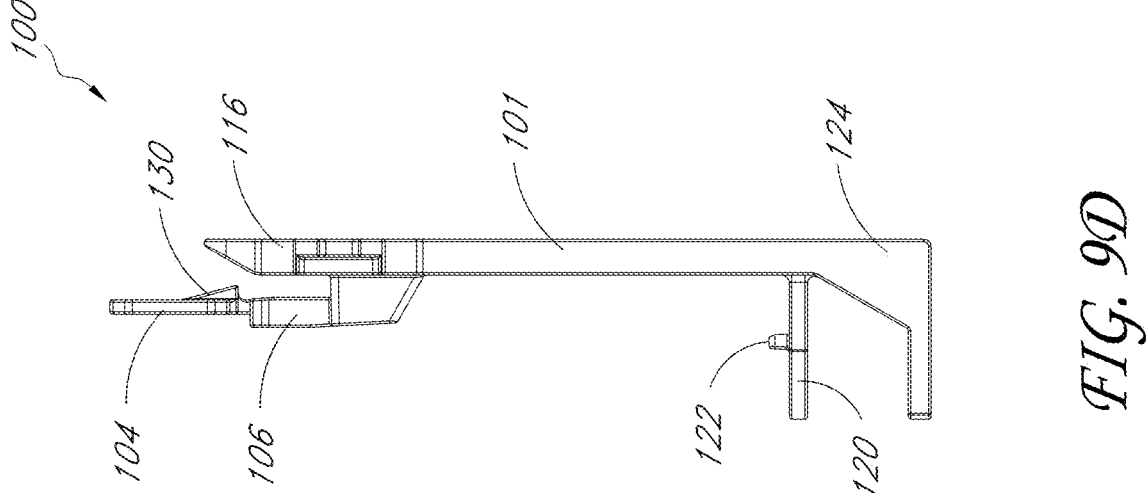
FIG. 9D is a right view of the pump-mounting system of FIG. 9A.
Figure 9C:
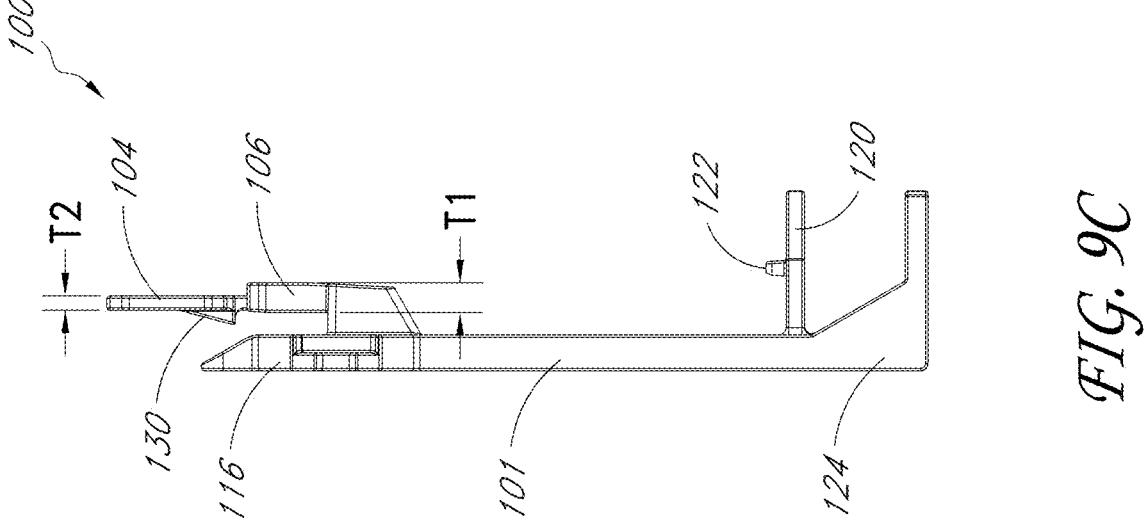
FIG. 9C is a left view of the pump-mounting system of FIG. 9A.
Figure 9F:
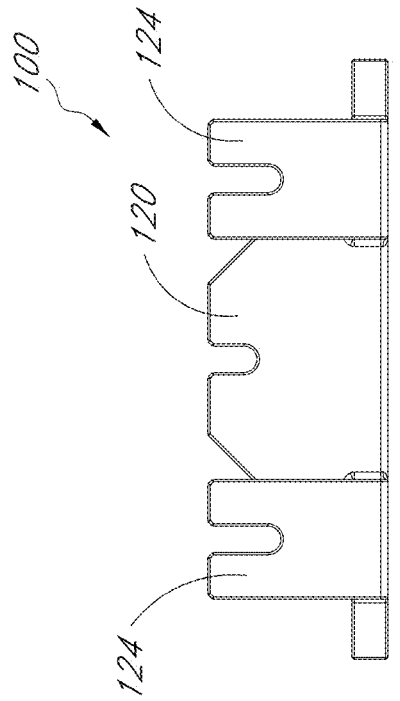
FIG. 9F is a bottom view of the pump-mounting system of FIG. 9A.
Figure 9E:
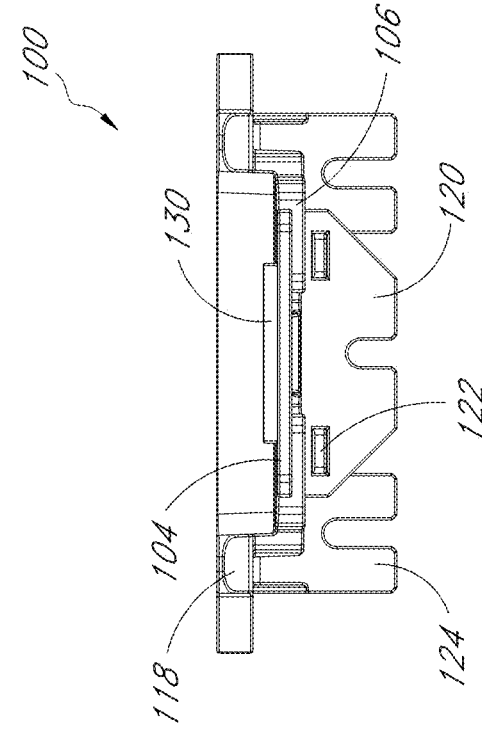
FIG. 9E is a top view of the pump-mounting system of FIG. 9A.

FIG. 9A illustrates a front view of a pump-mounting system 100 according to certain aspects of the present disclosure. FIG. 9B illustrates a rear view of the pump-mounting system 100. FIG. 9C illustrates a left side view of the pump-mounting system 100. FIG. 9D illustrates a right side view of the pump-mounting system 100. As indicated in FIG. 9C, the securement tabs 106 can have a first thickness T1 and the handle 104 can have a second thickness T2. The first thickness T1 can be greater than second thickness T2. In some aspects, the first thickness T1 can be greater than the second thickness by: 30%, 40%, 50%, 60%, 70%, 100%, 150%, 200%, a value between the aforementioned values, or otherwise. FIGS. 9C and 9D illustrate that the canted surface 130 can overhang at least a portion of the seating slot 134 when the pump-mounting system 100 is in an "at rest" configuration in which no force is being applied to deflect the handle 104. FIG. 9E illustrates a top view of the pump-mounting system 100 of FIG. 9A. FIG. 9F illustrates a rear view of the pump-mounting system 100 of FIG. 9A.

In some aspects, the pump-mounting system 100 can utilize a snap-fit latch that allows for quick mounting and dismounting of a pump or other device. In some aspects, the pump-mounting system 100 can be attached on any flat surface, such as a vertical wall or a horizontal platform. In some aspects, after the pump-mounting system 100 is securely attached to a support surface (e.g., vertical wall or horizontal platform), a pump 10 can be easily mounted onto or removed from the pump-mounting system 100 without the use of a tool. The pump 10 can be mounted onto the pump-mounting system 100 by hooking the pump 10 onto the docking portion 102 until the docking portion 102 snaps in place with an audible click, thereby informing a user that the pump 10 is secured onto the pump-mounting system 100. To remove the pump 10 from the pump-mounting system 100, the handle 104 of the docking portion 102 can be moved toward the pump 10 as the pump 10 is lifted off of the pump-mounting system 100, allowing the pump 10 to be removed in less than one minute. The pump-mounting system 100 can include a safety feature such as a through hole or slot 138 that is sized to allow a fastener (e.g., thumb screw) to pass through the support shelf 120 of the pump-mounting system 100 and screw into a portion of the housing of the pump 10. The fastener can be attached to the pump 10 through the through hole or slot 138 when it is desired to leave the pump 10 attached to the pump-mounting system 100, such as when a safety issue or other concern prioritizes maintaining the pump 10 attached to the pump-mounting system 100 over quick dismounting of the pump 10. In some aspects, the fastener can be removed from the through hole or slot 138 when it is desired to keep the pump 10 ready for quick dismounting of the pump 10 from the pump-mounting system 100, such as when a safety issue or other concern prioritizes quick dismounting of the pump 10 over maintaining the pump 10 attached to the pump-mounting system 100.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While the preferred embodiments of the present inventions have been described above, it should be understood that they have been presented by way of example only, and not of limitation. It will be apparent to persons skilled in the relevant art that various changes in form and detail can be made therein without departing from the spirit and scope of the inventions. Thus the present inventions should not be limited by the above-described exemplary embodiments, but should be defined only in accordance with the following claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A pump-mounting system comprising:
a base plate;
a stabilizer tab connected to the base plate;
a handle connected to the base plate by a hinge such that the handle can move relative to the stabilizer tab, the handle extending in a direction that is away from the stabilizer tab and toward the base plate; and
a support shelf.

2. The pump-mounting system of claim 1, further comprising a stop surface that extends from the support shelf.

3. The pump-mounting system of claim 1, wherein the support shelf comprises a slot configured to align with a threaded hole on a housing of a pump when the pump is attached to the pump-mounting system.

4. The pump-mounting system of claim 1, wherein the stabilizer tab comprises a first stabilizer tab and a second stabilizer tab, the handle disposed between the first and second stabilizer tabs.

5. The pump-mounting system of claim 1, further comprising an arm extending from the base plate and disposed lateral of the stabilizer tab.

6. The pump-mounting system of claim 5, wherein the arm comprises a ramped leading edge.

7. The pump-mounting system of claim 1, further comprising a docking portion extending from the base plate to form a seating slot disposed between the docking portion and the base plate.

8. The pump-mounting system of claim 1, wherein the stabilizer tab has a thickness that is greater than a thickness of the handle.

9. The pump-mounting system of claim 8, wherein the thickness of the stabilizer tab is between 30% to 200% greater than the thickness of the handle.

10. A pump-mounting system comprising:
a base plate;
a stabilizer tab connected to the base plate;
a handle connected to the base plate by a hinge such that the handle can move relative to the stabilizer tab, the handle extending in a direction that is away from the stabilizer tab and toward the base plate; and
an arm extending from the base plate and disposed lateral of the stabilizer tab, wherein the arm comprises a ramped leading edge.

11. The pump-mounting system of claim 10, wherein the stabilizer tab comprises a first stabilizer tab and a second stabilizer tab, the handle disposed between the first and second stabilizer tabs.

12. The pump-mounting system of claim 10, further comprising a docking portion extending from the base plate to form a seating slot disposed between the docking portion and the base plate.

13. The pump-mounting system of claim 10, wherein the stabilizer tab has a thickness that is greater than a thickness of the handle.

14. The pump-mounting system of claim 13, wherein the thickness of the stabilizer tab is between 30% to 200% greater than the thickness of the handle.

15. A pump-mounting system comprising:
a base plate;
a stabilizer tab connected to the base plate;
a handle connected to the base plate by a hinge such that the handle can move relative to the stabilizer tab, the handle extending in a direction that is away from the stabilizer tab and toward the base plate; and
a docking portion extending from the base plate to form a seating slot disposed between the docking portion and the base plate.

16. The pump-mounting system of claim 15, wherein the stabilizer tab comprises a first stabilizer tab and a second stabilizer tab, the handle disposed between the first and second stabilizer tabs.

17. The pump-mounting system of claim 15, further comprising an arm extending from the base plate and disposed lateral of the stabilizer tab.

18. The pump-mounting system of claim 15, wherein the stabilizer tab has a thickness that is greater than a thickness of the handle.

19. The pump-mounting system of claim 18, wherein the thickness of the stabilizer tab is between 30% to 200% greater than the thickness of the handle.

* * * * *